US007206321B1

(12) United States Patent
Bansal et al.

(10) Patent No.: US 7,206,321 B1
(45) Date of Patent: Apr. 17, 2007

(54) METHOD AND APPARATUS FOR FLEXIBLY FILTERING SCHEDULING MESSAGES IN A COMMUNICATION SYSTEM

(75) Inventors: Sahil Bansal, San Diego, CA (US); Moshe Goldenberg, Karmiel (IL); Brett A. Bernath, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 1037 days.

(21) Appl. No.: 09/966,374

(22) Filed: Sep. 27, 2001

(51) Int. Cl.
*H04L 12/54* (2006.01)
(52) U.S. Cl. ..................... 370/461; 370/462
(58) Field of Classification Search ............ 370/230.1, 370/437, 458, 474, 395.1; 725/111
See application file for complete search history.

(56) References Cited

U.S. PATENT DOCUMENTS

| 4,553,161 | A | * | 11/1985 | Citta .......................... 725/131 |
| 5,546,119 | A | * | 8/1996 | Bestler et al. ................ 725/131 |
| 5,570,347 | A | * | 10/1996 | Bestler et al. ................ 370/461 |
| 5,745,837 | A | * | 4/1998 | Fuhrmann .................... 725/114 |
| 5,910,970 | A | * | 6/1999 | Lu ............................. 375/377 |
| 6,629,288 | B1 | * | 9/2003 | Bernath et al. .............. 714/807 |
| 2003/0218622 | A1 | * | 11/2003 | Chang et al. ................ 345/698 |

OTHER PUBLICATIONS

"Supporting MPEG video transport on DOCSIS-compliant cable networks", Bushmitch et al. Communications, IEEE Journal on Publication Date: Sep. 2000.*
"DOCSISTM cable modem technology", Fellows et al. Communications Magazine, IEEE Publication Date: Mar. 2001.*
"DOCSISTM cable modem technology", Fellows et al. Communications Magazine, IEEE Publication Date: Mar. 2001.*
"Supporting MPEG video transport on DOCSIS-compliant cable networks", Bushmitch et al. Communications, IEEE Journal on Publication Date: Sep. 2000.*
"Media Access Control Protocol Based on DOCSIS 1.1", Sater et al.*
"Data-Over-Cable Service Interface Specifications, Radio Frequency Interface Specification SP-RFIv1.1-I05-000714", Cable Television Laboratories, Inc., 1999-2000, Sections 3.1-3.6.2 and 7.1-7.5.2, pp. 11-21 and 129-141.

* cited by examiner

*Primary Examiner*—Hassan Kizou
*Assistant Examiner*—Salman Ahmed
(74) *Attorney, Agent, or Firm*—The Eclipse Group LLP

(57) ABSTRACT

A method and apparatus for flexibly filtering upstream scheduling messages in a communication system is described. The inventive method and apparatus uses software to rapidly filter a MAP message comprising a plurality of information elements. In accordance with the inventive method, a communication device inputs a MAP message and outputs a filtered MAP message comprising upstream transmission information relevant only to the communication device. The communication device stores data relevant to its upstream transmit opportunities. This data is derived from information elements that are associated with the communication device. In one embodiment, the communication device stores a transmit time. In another embodiment, the communication device stores a transmit time and a transmit duration. In yet another embodiment, the communication device stores a transmit time, a transmit duration and an IUC.

9 Claims, 6 Drawing Sheets

Exemplary MAP Message

METHOD AND APPARATUS FOR FLEXIBLY FILTERING SCHEDULING MESSAGES IN A COMMUNICATION SYSTEM

BACKGROUND

1. Field

This invention relates to communication systems, and more particularly to a method and apparatus for flexibly filtering scheduling messages in communication systems.

2. Description of Related Art

Some communication systems, such as broadband communication systems as an example, facilitate high-speed connectivity and data transport from a point-to-multipoint basis.

Exemplary broadband communication systems include, without limitation, cable modem systems that facilitate the transport of data between cable modems and information providers such as cable television networks and Internet web sites. FIG. 1 depicts a simplified block diagram of an exemplary cable modem system. The exemplary cable modem system 10 of FIG. 1 comprises a wide area network (WAN) 12, a cable modem termination system (CMTS) 14, a plurality of cable modems (CM) 16 and a plurality of customer premises equipment (CPE) 18 (such as, for example, personal computers and televisions). The WAN 12 connects the cable modem system 10 to other networks such as a cable television network 22 or the well-known Internet via an Internet backbone 20. The CMTS 14 connects the plurality of cable modems 16 to the WAN 12. Cable modems typically provide high-speed Internet and cable television connectivity to businesses and homes.

Exemplary cable modem systems are described in more detail in a specification produced by the Cable Television Laboratories, Inc., entitled "Data-Over-Cable Service Interfaces Specification—Radio Frequency Interface Specification SP-RFIv11-105-000714," published in the year 2000, and referred to below as the "DOCSIS specification", hereby incorporated for reference herein in its entirety for its teachings on cable modem systems. As described in the DOCSIS specification, data packets transport data between cable modems and their associated CMTS. In accordance with the DOCSIS specification, upstream transmissions occur when data is transmitted from customer premises equipment. Downstream transmission is defined as the transmission of data to the customer premises equipment (e.g. from a cable television network). In cable modem systems, well-known protocols such as TDD and TDMA aid in scheduling data packet traffic on the upstream and downstream transmission paths.

Due to the wide variety of CPE service requirements, and due to the large number of CPEs serviced by any one CMTS, the bandwidth scheduling process in a communication system such as that shown in FIG. 1 can become overly burdensome and complex. This is especially true with regard to the scheduling of upstream bandwidth. A CMTS schedules upstream bandwidth by assigning transmit opportunities (i.e., time intervals) on the upstream transmission path to its associated cable modems. The CMTS transmits an upstream scheduling message comprising information regarding assigned transmit opportunities to its associated cable modems on the downstream. The cable modems use this information to determine their assigned transmit opportunities. An example of an upstream scheduling message is the well-known "Upstream Bandwidth Allocation Map" (MAP) message. The MAP message comprises a plurality of information elements ("IE") that describe information regarding the transmit opportunities of cable modems that are associated with the CMTS transmitting the message. Methods of filtering upstream scheduling messages help provide high-speed connectivity and data transport in communication systems.

In accordance with one known method of filtering upstream scheduling messages, a CMTS periodically transmits a MAP message to all of its associated CMs on the downstream transmission path. An associated cable modem decodes and filters the MAP message. The method subsequently stores information regarding IEs associated with the CM. Each CM performs the above-described decoding and filtering to determine its transmit opportunities. In accordance with this method, IEs comprise information such as service identifiers, well-known addresses, interval usage codes, transmission times and transmission durations. This information is used by the modems to identify assigned transmit opportunities.

As is well known, a service identifier (SID) represents an address that identifies a cable modem or set of cable modems. SIDs typically comprise three types of addresses: "unicast" "multicast" and "broadcast". Unicast addresses are defined herein as addresses that uniquely identify a cable modem. A unicast address aids a cable modem in determining time intervals that are dedicated solely for the cable modem associated with the unicast address. Multicast and broadcast addresses are well-known addresses. Broadcast addresses are defined herein as addresses that identify all cable modems that are associated with the CMTS. Multicast addresses are defined herein as addresses that identify a group of cable modems that are associated with the CMTS. A well-known address aids a cable modem in determining time intervals during which all or a group of cable modems are allowed to transmit on the upstream transmission path (e.g., contention time intervals). An Interval Usage Code (IUC) specifies an upstream burst parameter (e.g., QPSK and QAM-16) for the transmit opportunity. In accordance with the above-described method of filtering upstream scheduling messages, cable modems filter for IEs typically utilizing hardware means.

Disadvantageously, the above-described existing method for filtering upstream scheduling messages is relatively inflexible because the filtering is processed in hardware. New hardware design must be developed for different communication systems or when upgrades to the system occur. This inflexibility increases costs associated with the production of cable modems because different hardware must be designed and installed in cable modems produced for new markets, varying communication systems and upgraded systems.

Therefore, a need exists for a method and apparatus for flexibly filtering upstream scheduling messages in a communication system that can be easily implemented, relatively fast and overcomes the disadvantages of other methods and apparatuses such as the above-described method. The present disclosure provides such an upstream scheduling message filtering method and apparatus.

SUMMARY

This disclosure describes the method and apparatus for flexibly filtering upstream scheduling messages in a communication system. The present method and apparatus utilizes software to rapidly filter a MAP message comprising a plurality of information elements. In accordance with the method disclosed herein, a communication device inputs a MAP message and outputs a filtered MAP message comprising upstream transmission information relevant only to the communication device. Thus, the communication device stores data relevant to its upstream transmit opportunities. This data is determined from information elements that are associated with the communication device. In one embodiment, the communication device stores a transmit time. In another embodiment, the communication device stores a transmit time and a transmit duration. In yet another embodiment, the communication device stores a transmit time, a transmit duration and IUC.

In a first embodiment of the inventive method, a communication device inputs a MAP message and filters the MAP message to obtain IEs associated with the CM. The method stores transmit opportunity information from IEs that are associated with the communication device in a filtered MAP message. In one embodiment, the filtered MAP message comprises IE information such as a "SID" and an "IUC". The method then obtains another MAP message and processes it in the above-described manner.

In a second embodiment, the method processes an IE in both hardware and software. In the second embodiment, the method determines whether an IE is a well-known address in software and whether an IE is a unicast address that is associated with the communication device in hardware. In one embodiment the hardware and software processing is completed in serial. In another embodiment, the hardware and software processing is completed in parallel.

In a third embodiment, the method performs a DMA operation on the MAP input map to align the message on a D-word boundary. By aligning the MAP message on a D-word boundary, processing speed is increased because the method processes the D-word aligned MAP message on a D-word by D-word manner.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations.

The disclosed devices and methods are methods and apparatus for flexibly filtering upstream scheduling messages in communication systems. The present inventive method and apparatus utilizes software to rapidly filter a MAP message that comprises a plurality of information elements. In accordance with the disclosed method, a communication device inputs a MAP message and outputs a filtered MAP message including upstream transmission information that is relevant to the communication device. Thus, the communication device is able to store data relevant to its upstream transmit opportunities. This data is determined from information elements associated with the communication device. In one embodiment, the communication device stores a transmit time. In another embodiment, the communication device stores a transmit time and a transmit duration. In yet another embodiment, the communication device stores a transmit time, a transmit duration and an Interval Usage Code (IUC). The disclosed methods and apparatus can be utilized by a number of communication systems, including without limitation a broadband communication system utilizing cable modems. An exemplary cable modem system adapted for use with the present disclosure is now described.

Exemplary Cable Modem System Adapted for use with the Disclosed System and Device The exemplary cable modem system described hereinbelow is described in greater detail in the DOCSIS specification incorporated by reference herein. One skilled in the art shall recognize that the described broadband communication system is exemplary only and therefore is not meant to be a limitation. Other broadband communication systems can be utilized with the disclosed methods and apparatus without departing from the scope or spirit of the present disclosure and its claims. Examples of broadband communication systems that can be utilized with the described methods and apparatus include broadband wireless communication systems, cellular IP communication systems and satellite communication systems. The disclosed methods and apparatus can be utilized in any broadband communication system where filtering of upstream scheduling messages is desired.

Figure 1:
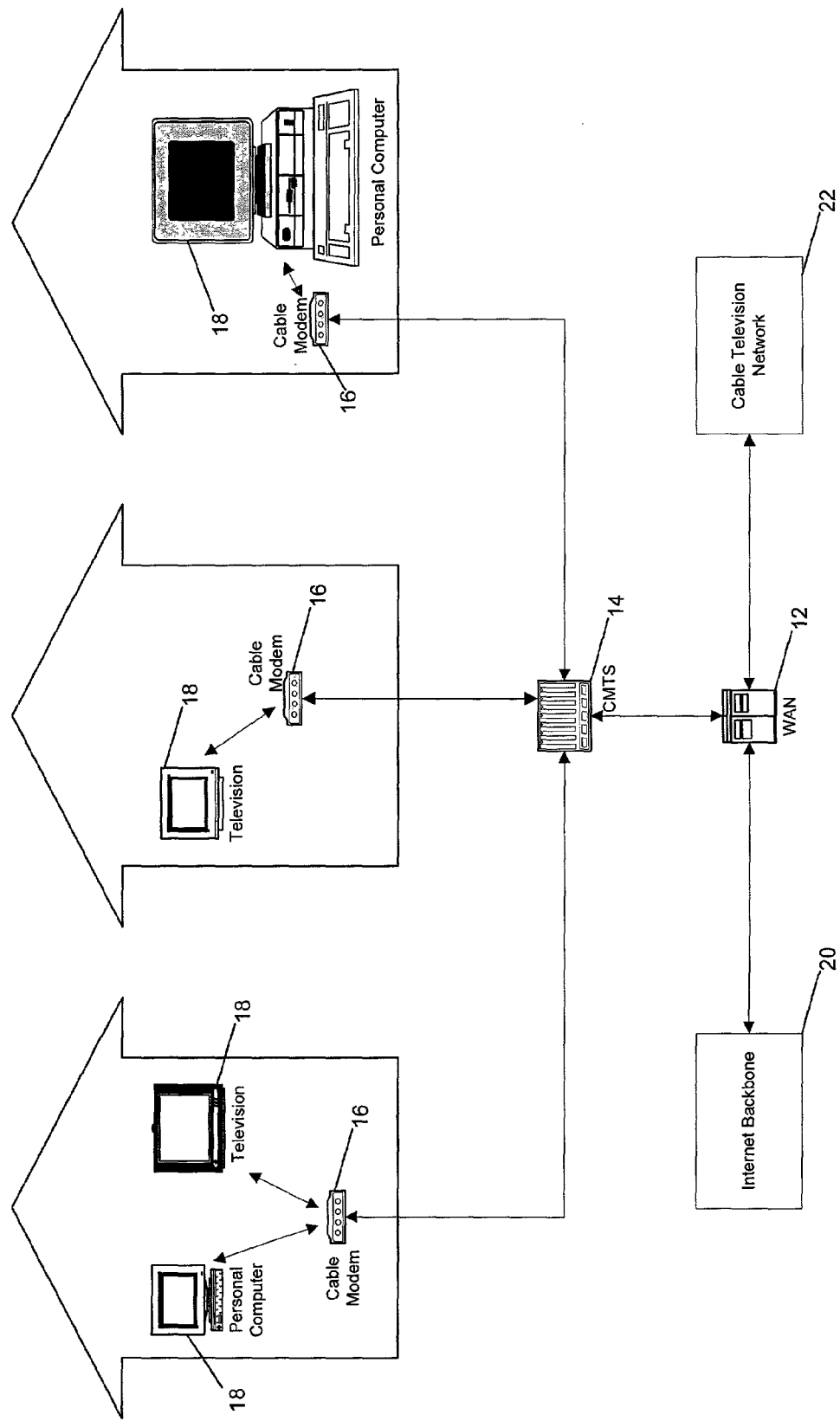
FIG. 1 is a simplified block diagram of an exemplary cable modem system.
Figure 2:
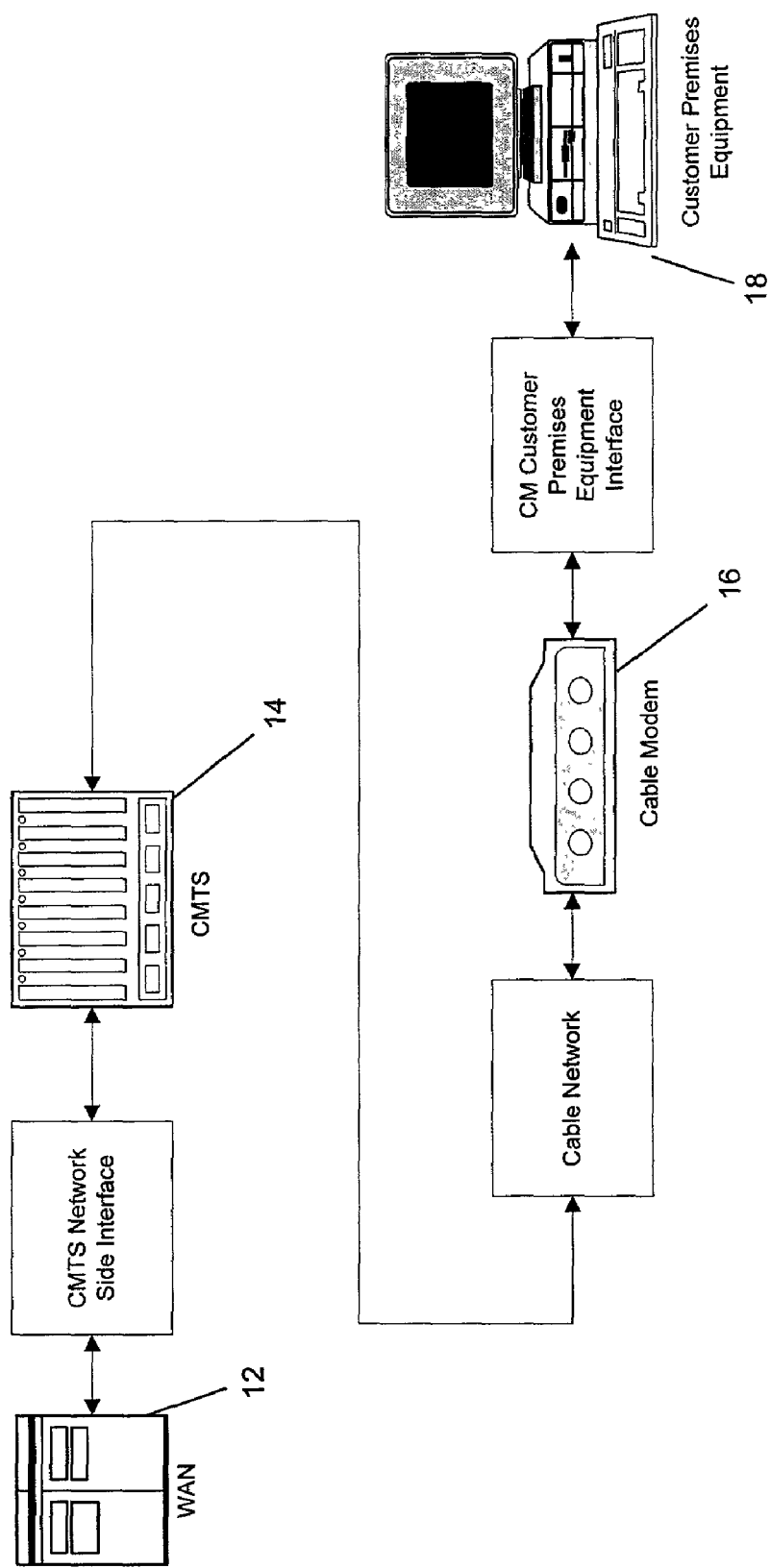
FIG. 2 is a simplified block diagram of an exemplary cable modem system adapted for use with the devices and methods disclosed herein.

FIG. 2 depicts a simplified block diagram of an exemplary cable modem system adapted for use with the disclosed methods and apparatus. As shown in FIG. 2 and described in more detail in the incorporated DOCSIS specification, the exemplary cable modem system 10 comprises a wide-area network (WAN) 12, a cable modem termination system (CMTS) 14, a cable modem (CM) 16 and a customer premises equipment (CPE) 18. The WAN 12 operatively connects the CMTS 14 to other networks such as the well-known Internet via an Internet backbone 20 (FIG. 1) or a cable television network 22 (FIG. 1) via a CMTS network side interface.

As shown in FIG. 2, the CMTS 14 is operatively coupled to the cable modem 16 via a cable network. Although FIG. 2 depicts only one cable modem 16, one skilled in the communication art shall recognize that the exemplary cable modem system is capable of operatively connecting multiple cable modems to the CMTS 14. The cable modem 16 is operatively connected to the customer premises equipment 18 via a cable modem customer premises equipment interface. One skilled in the communication art shall recognize that multiple CPEs 18 can be operatively connected to the CM 16.

The exemplary cable modem communication system adapted for use with the disclosed methods and apparatus utilizes a Time-Division Duplexing (TDD) modulation scheme. However, those skilled in the communications art shall recognize that other modulation schemes (such as TDMA and CDMA) can be utilized with the exemplary cable modem system without departing from the scope or spirit of the disclosed methods and apparatus.

In the exemplary cable modem system of FIG. 2, the CMTS 14 assigns transmit opportunities to its associated cable modems so they can transmit data on the upstream transmission link in an orderly manner. The CMTS 14 transmits these assigned transmit opportunities to its associated cable modems on the downstream transmission link using a well-known message known as a "MAP" message. The format used by such an exemplary MAP message is now described with reference to FIG. 3.

Figure 3:
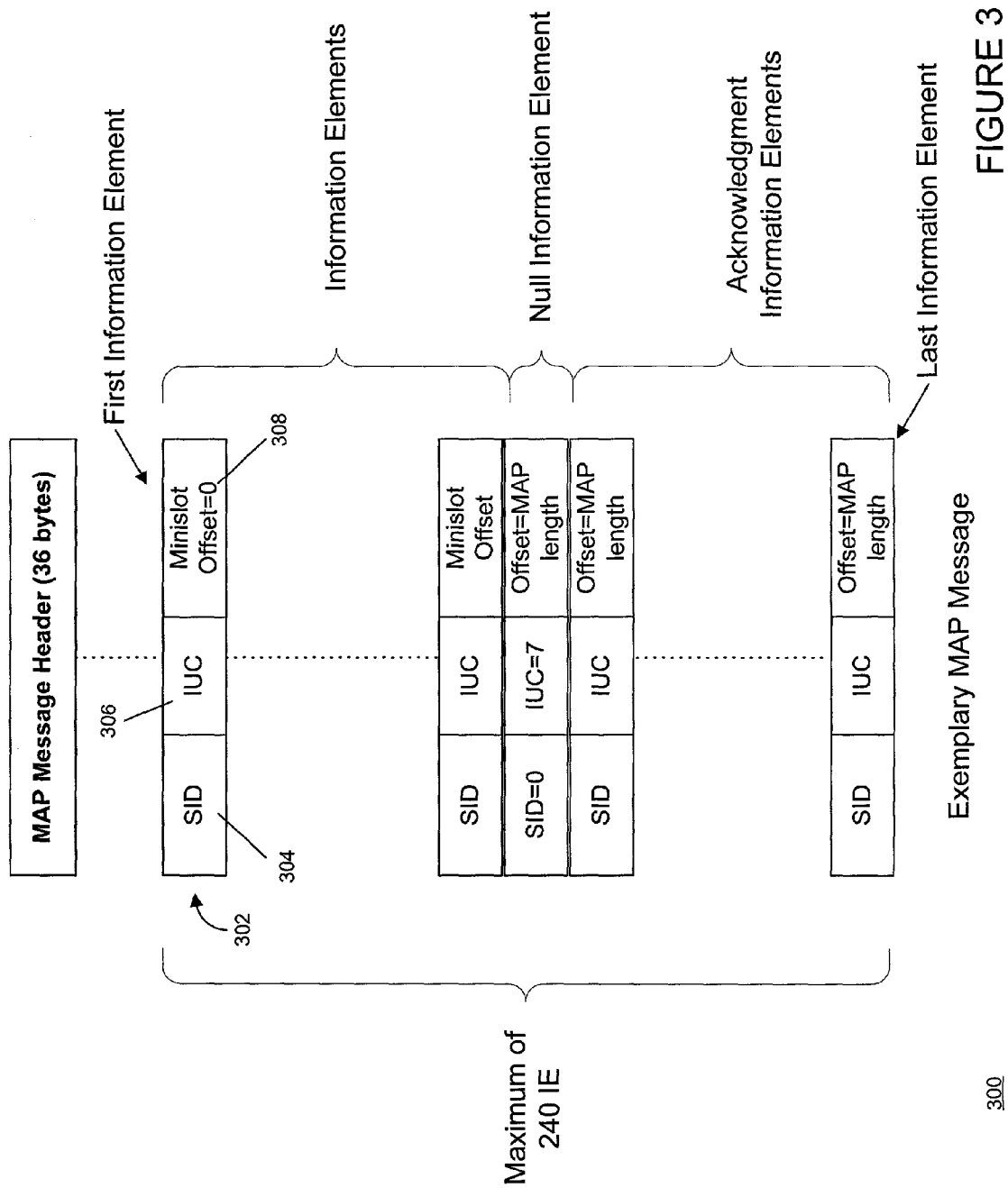
FIG. 3 is a representation of an exemplary MAP message.

FIG. 3 shows the format used by an exemplary MAP message 300. As shown in FIG. 3, the exemplary MAP message 300 comprises a plurality of information elements (IE). Each IE 302 of the exemplary MAP message 300 comprises a service identifier (SID) 304, an Interval Usage Code (IUC) 306 and a Minislot Offset 308. The SID 304 identifies a cable modem or set of cable modems associated with a specific IE. The IUC 306 identifies an upstream burst parameter to be used for a transmit opportunity associated with an IE. The SID index is an index into a SID table that is associated with the IE. The Minislot Offset 308 specifies the beginning time of the transmit opportunity associated with the IE. The duration of the transmit opportunity associated with the IE can be calculated by subtracting the offset value of the present IE from the offset value of the next IE. In accordance with the exemplary cable modem system and the incorporated DOCSIS specification, the units for the Minislot Offset 308 are minislots (described in more detail in the DOCSIS specification). One skilled in the art shall recognize that an IE can comprise different configurations without departing from the scope or spirit of the disclosed methods and apparatus. For example, an IE can comprise an SID 304 and a transmission time.

Referring again to FIG. 3, in one embodiment, the exemplary MAP message 300 comprises a maximum of 240 IE 302 and a minimum of 2 IE (one normal IE and one null IE). One skilled in the communication art shall recognize that other maximum and minimum IE values can be utilized with the disclosed methods and apparatus without departing from the scope or spirit of the disclosed methods and apparatus. In the exemplary map message, shown in an SID 304 is 14 bits in length; an IUC 306 is 4 bits in length; and a Minislot Offset 308 is 14 bits in length.

In accordance with the exemplary cable modem system, the plurality of information elements comprises three types of IE: Real IE, Null IE and Acknowledgment IE. Real IEs represent transmit opportunities for cable modems that are associated with a particular CMTS. A Null IE represent the end of the real IE list and is used to calculate the length of the last real IE. The Acknowledgment IEs are all of length 0 (their offset is equal to the null IE offset) and indicate that the CMTS has received a bandwidth request or contention data from the cable modem that is associated with the IE, however, in cases of bandwidth request, the CMTS has not yet assigned transmit opportunities (i.e., bandwidth) to the cable modem. Thus, the Acknowledgment IE acknowledges receipt of a bandwidth request or contention data and thereby prevent the cable modem associated with the IE from sending another bandwidth request or contention data. The Acknowledgment IEs thereby reduce upstream traffic.

The exemplary map message 300 of FIG. 3 includes a first group of Real IEs, a second group of one Null IE, and a third group of Acknowledgment IEs. As described in more detail in the DOCSIS specification, this structure reduces the amount of information required to be transmitted by a CMTS to associated cable modems.

The above-described exemplary cable modem communication system adapted for use with the disclosed methods and apparatus can be used in conjunction with several embodiments of the disclosed methods and apparatus described hereinbelow. A first embodiment of the disclosed methods and apparatus is now described.

A First Embodiment

In a first embodiment of the inventive method, a communication device inputs a MAP message and filters the MAP message to obtain IEs that are associated with the CM. The method stores transmit opportunity information from IEs that are associated with the communication device in a filtered MAP message. In one embodiment, the filtered MAP message comprises IE information such as a SID, an IUC, a time offset and an IE length. The first embodiment is now described in more detail with reference to FIG. 4.

Figure 4:
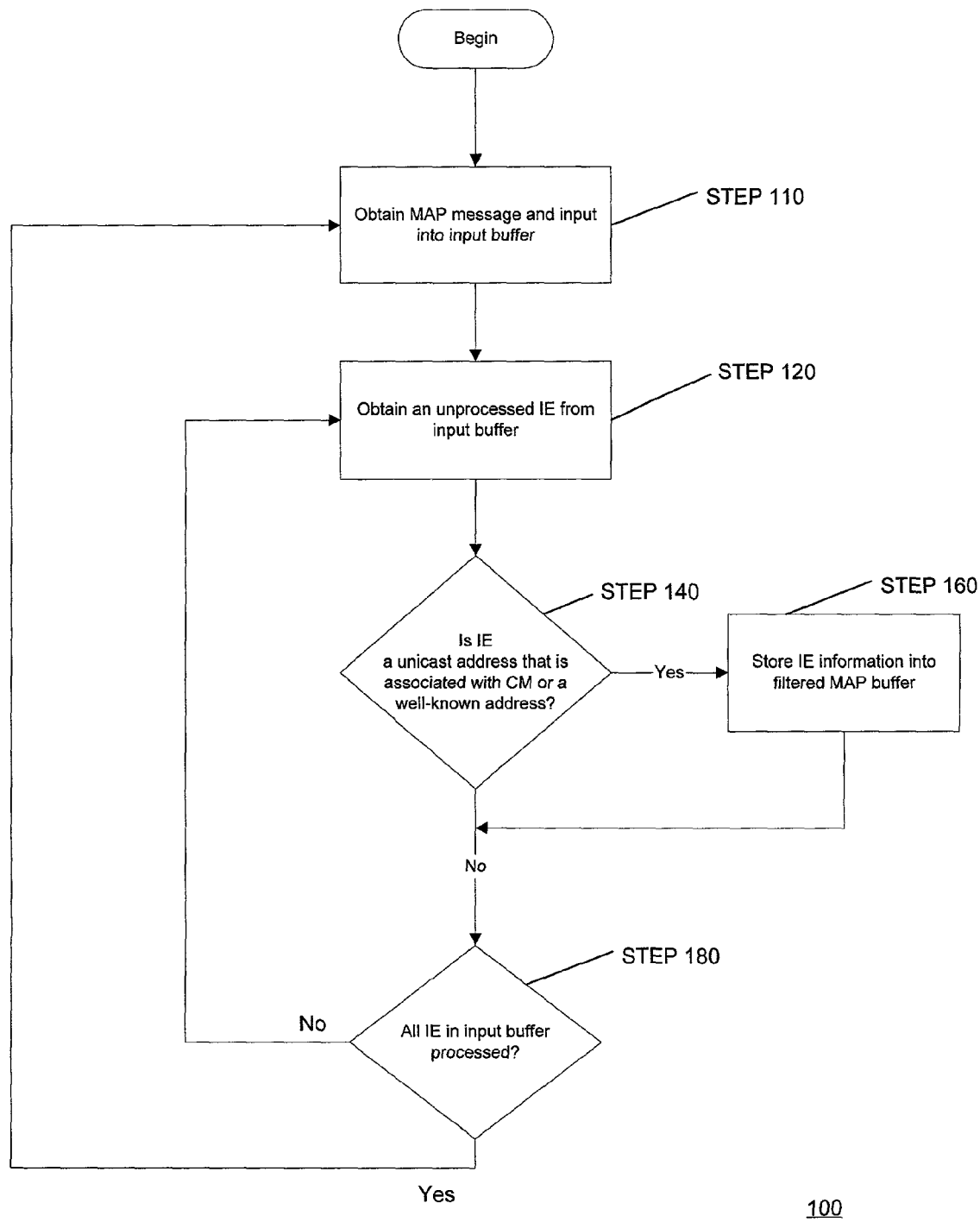
FIG. 4 is a flowchart of a first embodiment of the methods disclosed herein.

FIG. 4 shows a flowchart of a first embodiment of the method. As shown in FIG. 4, the first embodiment 100 of the present inventive method begins at a STEP 110 whereat the method obtains a MAP message and inputs the MAP message into an input buffer. The method then proceeds to a STEP 120 whereat the method obtains an unprocessed IE from the input buffer. An unprocessed IE is defined herein as an IE that has not yet been processed by the method of the disclosed apparatus. The method then proceeds to a decision STEP 140 whereat the method determines whether the unprocessed IE is a unicast address associated with the communication device or a well-known address. If the unprocessed IE is a unicast address that is associated with the communication device or a well-known address, the method proceeds to a STEP 160, else the method proceeds to a decision STEP 180.

At the STEP 160 the method stores information regarding a communication device's transmit opportunities as determined from the IE currently being processed. In one embodiment, the method stores information comprising only the communication device's transmit time. In accordance with this embodiment, the communication device's transmit duration can be determined from the transmit time of the next IE. It is noted that by subtracting a transmit time of an IE from the transmit time of a next IE, the transmit duration of the former IE is obtained. In another embodiment, the method stores information comprising the communication device's transmit time and transmit duration. In all embodiments, the method stores information comprising the SID and IUC.

In accordance with the STEP 160, the method stores the information obtained above into a filtered MAP buffer. The method then proceeds to the decision STEP 180. At the decision STEP 180 the method determines whether all IE in the input buffer have been processed. If so, the method returns to the STEP 110 to obtain another MAP message and to input the message into the input buffer, else the method returns to the STEP 120 to obtain another unprocessed IE from the input buffer.

The present disclosure is utilized in conjunction with the exemplary cable modem system described above with reference to FIG. 2. In one embodiment, the cable modem 16 of FIG. 2 processes the method 100 using software executed on a processor in the cable modem 16. Thus, in STEP 140, the method makes a determination of whether an IE is a unicast address that is associated with the cable modem 16 or a well-known address in software. Alternatively as described below in more detail, in a second embodiment the method performs the unicast address determination in hardware, but performs the well-known address determination in software. Software and hardware means are not described in detail herein as one skilled in the communication and computer art shall recognize that various software and hardware means can be used to implement the inventive method. A second embodiment is now described with reference to FIG. 5.

A Second Embodiment

In a second embodiment, the method processes an IE using a combination of both hardware and software means. In the second embodiment, the method determines whether an IE is a well-known address using means software. The method determines whether an IE is a unicast address (associated with the cable modem) using hardware means. One skilled in the communication and computer arts shall recognize that the method can alternatively perform the IE well-known address determination using hardware means without departing from the scope of the present disclosure. In one embodiment, the hardware and software processing is completed in a serial manner. In another embodiment, the hardware and software processing is completed in parallel. The second embodiment of the present disclosure is now described in greater detail below with reference to FIG. 5. The second embodiment is substantially similar to the first embodiment and thus similar STEPs are not described in detail.

Figure 5:
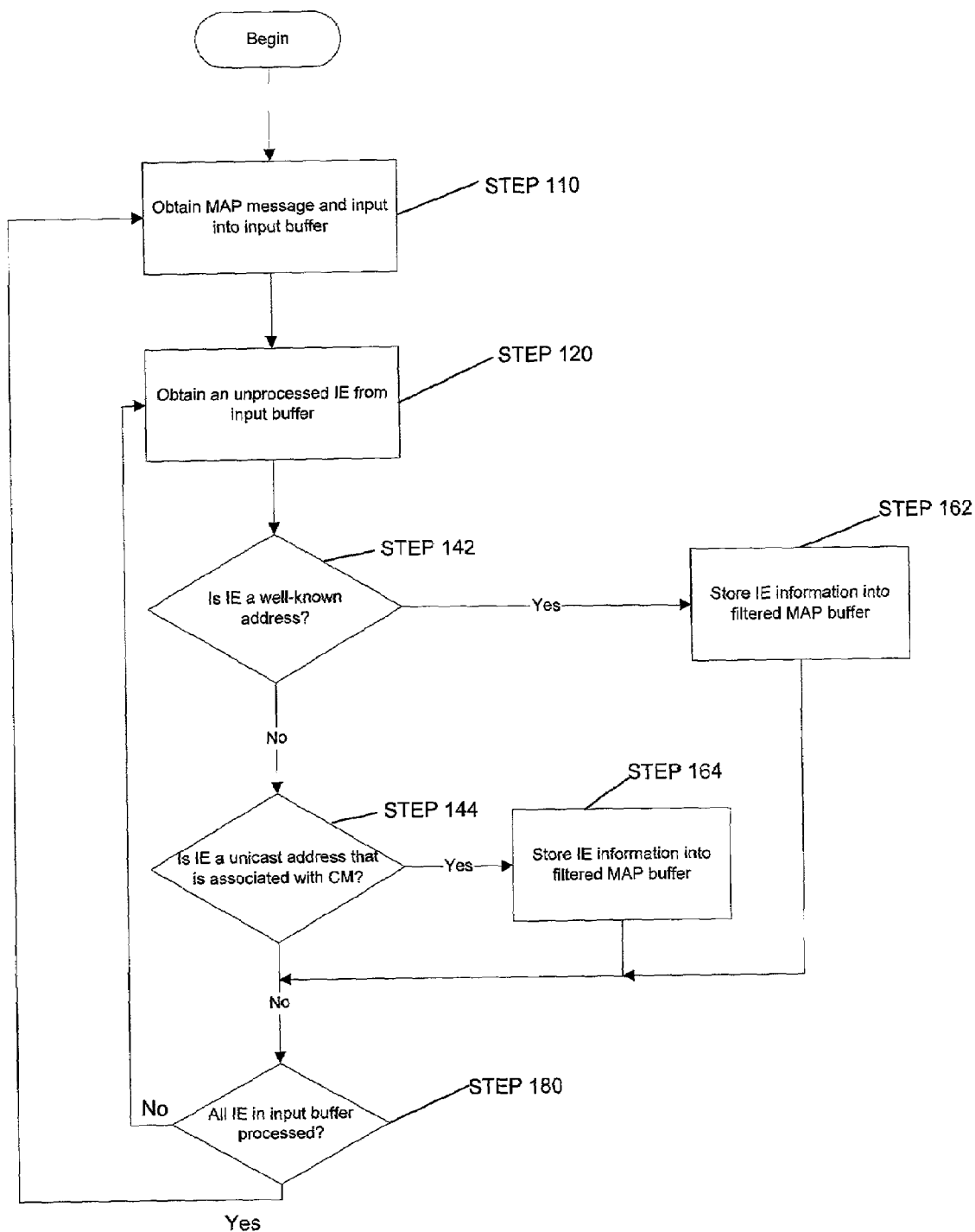
FIG. 5 is a flowchart of a second embodiment of the methods disclosed herein.

FIG. 5 shows a flowchart of the second embodiment of the present inventive method. As shown in FIG. 5, the method 200 begins at a STEP 110 whereat the method obtains a MAP message and inputs the MAP message into an input buffer. The method then proceeds to a STEP 120 whereat the method obtains an unprocessed IE from the input buffer. The method then proceeds to a decision STEP 142 whereat the method determines whether the IE is a well-known address associated with the communication device using software processing in a manner that is well known to one skilled in the communication and computer arts. If the IE is determined to be a well-known address, the method then proceeds to a STEP 162, else the method proceeds to a decision STEP 144. At the STEP 162, the method stores information regarding a communication device's transmit opportunities as determined from the IE that is currently being processed. The method stores the information into a filtered MAP buffer and proceeds to a decision STEP 180.

Referring again to FIG. 5, at the decision STEP 144 the method determines whether the unprocessed IE is a unicast address. In one embodiment, the method performs the STEP 144 in hardware by writing the SID of the IE into an input register (not shown). Writing the input register automatically causes the hardware to compare the input register to a hardware look-up table (not shown). A resulting comparison value is then read into another result register in a well-known manner. If a bit in the result register has a value of a logical one, the SID is equal to one of the look-up table SIDs and the IE represents a unicast address associated with the communication device. If the unprocessed IE is a unicast address that is associated with the communication device, the method proceeds to a STEP 164, else the method proceeds to the decision STEP 180. At the STEP 164, the method stores information regarding a communication device's transmit opportunities as determined from the IE currently being processed. The method stores the information into a filtered MAP buffer and proceeds to the decision STEP 180. At the decision STEP 180, the method determines whether all IEs in the input buffer have been processed. If so, the method returns to the STEP 110 to obtain another MAP message and inputs it into the input buffer, else the method returns to the STEP 120 to obtain another unprocessed IE from the input buffer. A third embodiment is now described below with reference to FIG. 6.

A Third Embodiment

In a third embodiment, the method of the present invention performs a DMA operation to align a MAP message on a D-word boundary. The DMA operation can be used to check the validity of the MAP message by simultaneously calculating the CRC checksum value and compare it to the message CRC. Processing speeds are increased by aligning MAP messages on D-word boundaries. Processing speeds are increased because the method can process the D-word-aligned MAP messages on a D-word by D-word basis. Without such an alignment, the method would be forced to process the MAP message on a much slower byte-by-byte basis. One skilled in the communication and computer arts shall recognize that the method can align a MAP message using other alignment configurations. For example, the method can align MAP messages by copying data using the processor CPU. The third embodiment is now described in greater detail below with reference to FIG. 6. The third embodiment is substantially similar to the second embodiment described above and thus similar STEPs are not described in detail below.

Figure 6:
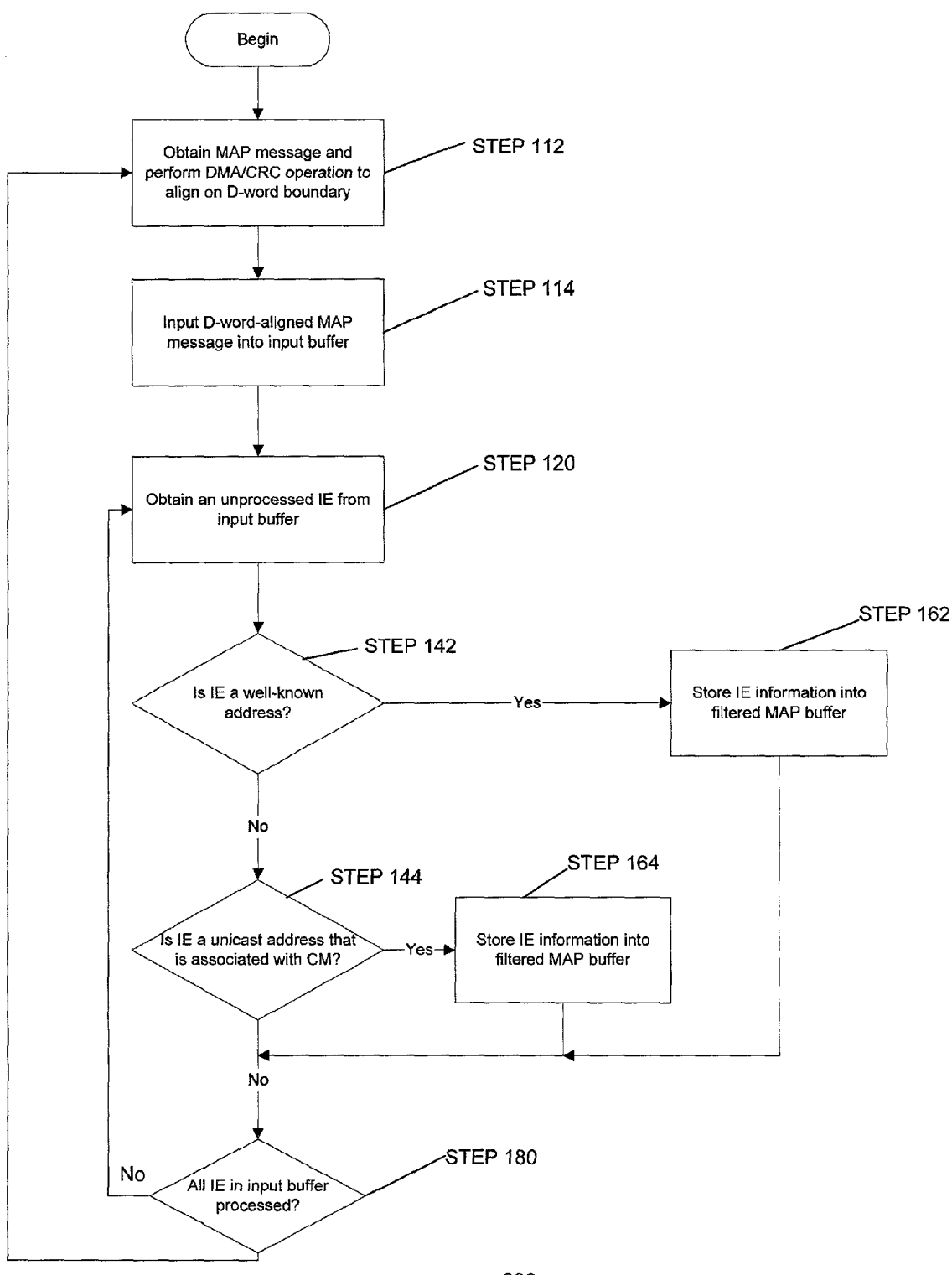
FIG. 6 is a flowchart of a third embodiment of the methods disclosed herein.

FIG. 6 shows a flowchart of the third embodiment 300. As shown in FIG. 6, the third embodiment 300 begins at a STEP 112 whereat the method obtains a MAP message and performs a DMA/CRC operation upon the MAP message. The DMA/CRC operation aligns the MAP message on a well-known D-word boundary. After the STEP 112, the method proceeds to a STEP 114 whereat the method inputs the D-word-aligned MAP message into an input buffer. The method then proceeds to a STEP 120.

The method obtains an unprocessed IE from the input buffer at the STEP 120. The method then proceeds to a decision STEP 142 whereat the method determines whether the unprocessed IE is a well-known address. If the IE is a well-known address, the method then proceeds to a STEP 162, else the method proceeds to a decision STEP 144. At the STEP 162 the method stores information regarding a communication device's transmit opportunities as determined from the IE currently being processed. The method stores the information into a filtered MAP buffer and proceeds to a decision STEP 180.

Referring again to FIG. 6, at the decision STEP 144, the method determines whether the IE is a unicast address that is associated with the communication device. In one embodiment, this determination is performed in software in a manner well known to those skilled in the communication and computer arts. If the unprocessed IE is a unicast address that is associated with the communication device, the method proceeds to a STEP 164, else the method proceeds to the decision STEP 180. At the STEP 164 the method stores information regarding a communication device's transmit opportunities as determined from the IE currently being processed. The method stores the information into a filtered MAP buffer and proceeds to the decision STEP 180. At the decision STEP 180, the method determines whether all IE in the input buffer have been processed. If so, the method returns to the STEP 112 to obtain another MAP message and to perform the DMA/CRC operation, else the method returns to the STEP 120 to obtain another unprocessed IE from the input buffer. The device of the present disclosure can be utilized in conjunction with the exemplary cable modem system and MAP messages described above with reference to FIGS. 2 and 3. The processing of MAP messages is now described.

The Present Inventive Method Utilized in Conjunction with an Exemplary Cable Modem System When utilized in conjunction with the exemplary cable modem system described above, processes MAP messages in the following manner. In the exemplary cable modem system, a MAP message includes a first group comprising Real IEs, a second group comprising a Null IE, and a third group comprising Acknowledgment IEs. The inventive method, when utilized in conjunction with the exemplary cable modem system, processes IEs in a specific order wherein the method begins by obtaining the first IE of the MAP message. As shown in FIG. 3, the top-most IE is the first IE of the MAP message. The method then processes IEs, in order, from the first IE to the last IE. Thus, the method first processes IEs from the first group. When all IEs from the first group are processed, the method obtains the Null IE from the second group. When the Null IE from the second group is processed the method then obtains IEs from the third group. When the last IE is processed, the method obtains another MAP message. The processing MAP messages in accordance with the first embodiment of the inventive method, when used in conjunction with the exemplary cable modem system, is now described in more detail.

Referring back to FIG. 4, the first embodiment 100 of the present inventive method begins at the STEP 110 whereat the method obtains a MAP message and inputs it into an input buffer. At the STEP 120, the method obtains a first information element (IE) of the MAP message. Referring now to FIG. 3, the first IE is the top-most IE of the MAP message. Thus, the method proceeds to the STEP 140 (FIG. 4) whereat the first IE is processed.

In accordance with the exemplary cable modem system, the first IE is typically an IE from the first group (i.e., the group comprising Real IEs). At STEP 120, the method processes IEs in accordance with the Real IE processing described below. The method processes IEs until a Null IE is encountered. As described above, a single Null IE is representative of the entire second group. A Null IE signifies the termination of the first group (Real IEs) and the beginning of the third group (Acknowledgment IEs). Thus, when the method encounters a Null IE, the disclosed methods and apparatus processes it in accordance with Null IE processing as described below. Due to the MAP message structure used, the method will determine that all IEs obtained after encountering the Null IE are Acknowledgment IEs. Thus, the method processes these IEs in accordance with Acknowledgment IE processing also (described below). Real IE, Null IE and Acknowledgment IE processing are now described in greater detail.

At the decision STEP 140 (FIG. 4), the method compares the SID of the IE that is currently being processed to a table comprising well-known addresses and unicast addresses associated with the cable modem executing the method. If the method matches the SID of the IE that is currently being processed to an address in the table, the method proceeds to the STEP 160. Real IE processing is now described in detail.

At the STEP 160 (FIG. 4), the method processes Real IEs by storing Real IE information into the filtered MAP buffer in the following manner. First, the SID of the present Real IE is written into a field comprising 16 bits wherein only the least significant 14 bits are utilized. Second, the IUC of the present Real IE is written into a field comprising 8 bits wherein only the least significant 4 bits are utilized. Third, the Minislot offset of the present Real IE is written into a field comprising 16 bits. Fourth, the Minislot length of the present Real IE is calculated and written into a field comprising 16 bits. The method then proceeds to the decision STEP 180 whereat the method determines whether all IEs in the input buffer have been processed. If all IEs have not been processed, the method returns to the STEP 120 to obtain another IE. If this IE is a Null IE then the method performs Null IE processing. Null IE processing is now described in more detail.

At the STEP 160 (FIG. 4), in one embodiment, the method processes a Null IE by storing Null IE information into the filtered MAP buffer in the following manner. First, the SID of the present Null IE is written into a field comprising 16 bits. The SID of a Null IE has a value of zero. Second, the IUC of the present Null IE is written into a field comprising 8 bits. The IUC of a Null IE has a value of 7. Third, the Minislot offset of the present Null IE is written into a field comprising 16 bits. Fourth, the Minislot length of the present Null IE is written into a field comprising 16 bits. The Minislot length of a Null IE is zero. The method then proceeds to the decision STEP 180 whereat the method determines whether all of the IEs in the input buffer have been processed. If all of the IEs have not been processed, the method returns to the STEP 120 to obtain another IE. As described above, all IEs following the Null IE are Acknowledgment IEs. The method performs the now-described Acknowledgment IE processing on all IEs that follow the Null IE (i.e., on all of the Acknowledgment IEs).

At the STEP 160 (FIG. 4), the method processes an Acknowledgment IE by storing Acknowledgment IE information into the filtered MAP buffer in the following manner. First, the SID of the present Acknowledgment IE is written into a field comprising 16 bits wherein only the least significant 14 bits are utilized. Second, the IUC of the present Acknowledgment IE is written into a field comprising 8 bits wherein only the least significant 4 bits are utilized. Third, the Minislot offset of the present Acknowledgment IE is written into a field comprising 16 bits. The Minislot offset of an Acknowledgement IE is the same as the Null IE's Minislot offset. Fourth, the Minislot length of the present Acknowledgment IE is written into a field comprising 16 bits. The Minislot length of an Acknowledgment IE is zero. The method then proceeds to the decision STEP 180 whereat the method determines whether all IEs in the input buffer have been processed. If all IEs have not been processed the method returns to the STEP 120 to obtain another IE. As described above, remaining IEs are processed until no additional unprocessed IEs remain in the input buffer. The method then returns to the STEP 110 to obtain a new Map message.

SUMMARY

A novel method and apparatus for flexibly filtering upstream scheduling messages in a communication system has been described, wherein the method utilizes software to rapidly filter a MAP message that comprises a plurality of information elements. The inventive method inputs a MAP message and outputs a filtered MAP message comprising upstream transmission information relevant to a cable modem. Thus, the cable modem can store data that is relevant to its upstream transmit opportunities. This data is determined from information elements associated with the cable modem. In one embodiment, the cable modem stores a transmit time. In another embodiment, the cable modem stores a transmit time and a transmit duration. In all embodiments, the cable modem stores a SID and an IUC. The disclosed methods and apparatus can be utilized with a number of communication systems, including, without limitation, a broadband communication system.

A number of embodiments have been described. Nevertheless, it will be understood that various modifications may be made without departing from the spirit and scope of the invention. For example, the present inventive method and apparatus can be implemented in software, hardware, or in a software/hardware combination. Furthermore, the present inventive method and apparatus can be used in virtually any type of communication system. Its use is not limited to a cable modem communication system. Alternatively, the present invention can be used in a wireless communication system. Accordingly, it is to be understood that the invention is not to be limited by the specific illustrated embodiment, but only by the scope of the appended claims.

What is claimed is:

1. A method of filtering upstream scheduling messages in a data communication system that includes a headend and at least one subscriber unit, wherein the system has an upstream and a downstream transmission path, the method comprising:
   obtaining a scheduling message from the headend, the scheduling message including a MAP message having a plurality of information elements (IE's), at least one IE including a service identifier (SID), an Interval Usage Code (IUC), a Minislot offset and a Minislot length value;
   filtering the MAP message to identify a plurality of IEs that correspond to a selected subscriber unit, and to generate a filtered MAP message having a plurality of data fields, where the MAP message includes at least one Null IE; and
   storing an information set based upon the plurality of IEs obtained in the step of filtering the MAP message into a filtered scheduling message that includes the following sub-steps:
   (1) before encountering Null IE, storing the information using a first process;
   (2) when encountering the Null IE, storing the information using a second process; and
   (3) after encountering the Null IE, storing the information using a third process.

2. The method of filtering upstream scheduling messages as set forth in claim 1 wherein the MAP message flier includes at least one Real IE.

3. The method of filtering upstream scheduling messages as set forth in claim 1, wherein the MAP message further includes at least one Real IE and at least one Acknowledgement IE.

4. The method of filtering upstream scheduling messages as set forth in claim 3, wherein the first process comprises Real IE processing.

5. The method of filtering upstream scheduling messages as set forth in claim 4, wherein the Real IE processing process comprises the following sub-steps:
   storing the SID in a 16-bit SID field;
   storing the IUC in an 8-bit IUC field;
   storing the Minislot offset in a 16-bit Minislot offset field;
   calculating a Minislot length; and
   storing the Minislot length in a 16-bit Minislot length field.

6. The method of filtering upstream scheduling messages as set forth in claim 1, wherein the second process comprises Null IE processing.

7. The method of filtering upstream scheduling messages as set forth in claim 6, wherein Null IE processing comprises the following sub-steps:
   storing a value of Zero in a 16-bit SID field;
   storing a value of 7 in an 8-bit IUC field;
   storing the Minislot offset in a 16-bit Minislot offset field; and
   storing a value of zero in a 16-bit Minislot length field.

8. The method of filtering upstream scheduling messages as set forth in claim 1, wherein the third process comprises Acknowledgment IE processing.

9. The method of filtering upstream scheduling messages as set forth in claim 8, wherein Acknowledgement IE processing comprises the following sub-steps:
   storing the SID in a 16-bit SID field;
   storing the IUC in an 8-bit IUC field;
   storing the Minislot offset in a 16-bit Minislot offset field; and
   storing a value of zero in a 16-bit Minislot length field.

* * * * *